United States Patent
Meyer et al.

(10) Patent No.: US 8,254,392 B2
(45) Date of Patent: Aug. 28, 2012

(54) LINK LAYER CONTROL PROTOCOL IMPLEMENTATION

(75) Inventors: Michael Meyer, Aachen (DE); Janne Peisa, Espoo (FI); Sabine Sories, Aachen (DE); Henning Wiemann, Aachen (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 202 days.

(21) Appl. No.: 12/516,711

(22) PCT Filed: Dec. 17, 2007

(86) PCT No.: PCT/EP2007/064062
§ 371 (c)(1),
(2), (4) Date: Dec. 30, 2009

(87) PCT Pub. No.: WO2008/074771
PCT Pub. Date: Jun. 26, 2008

(65) Prior Publication Data
US 2010/0118876 A1 May 13, 2010

(30) Foreign Application Priority Data
Dec. 18, 2006 (SE) .................................. 0602760

(51) Int. Cl.
*H04L 12/28* (2006.01)
*H04L 12/56* (2006.01)
(52) U.S. Cl. ........................................ 370/394; 370/236
(58) Field of Classification Search .................. 370/236, 370/278, 254, 400, 310, 394
See application file for complete search history.

(56) References Cited

U.S. PATENT DOCUMENTS

| 5,664,091 A * | 9/1997 | Keen ............................... 714/18 |
| 2003/0007480 A1* | 1/2003 | Kim et al. ...................... 370/349 |
| 2003/0191844 A1* | 10/2003 | Meyer et al. ................... 709/227 |
| 2003/0210669 A1 | 11/2003 | Vayanos et al. |
| 2004/0190523 A1 | 9/2004 | Gessner et al. |
| 2007/0091810 A1* | 4/2007 | Kim et al. ...................... 370/236 |
| 2007/0159985 A1* | 7/2007 | Sunell et al. ................... 370/254 |
| 2008/0123573 A1* | 5/2008 | Jiang ............................. 370/310 |

FOREIGN PATENT DOCUMENTS

| JP | 2001069055 A | 3/2001 |
| JP | 2002359641 A | 12/2002 |
| JP | 2005527545 A | 9/2005 |
| WO | 9636154 A1 | 11/1996 |
| WO | 0057594 A1 | 9/2000 |
| WO | 0219604 A1 | 3/2002 |

OTHER PUBLICATIONS

International Search Report for PCT/EP2007/064062 mailed May 6, 2008.
International Preliminary Examination Report for PCT/EP2007/064062 mailed Feb. 17, 2009.
Office Action for related Japanese Application No. 2009-540792, mailed Oct. 24, 2011.

\* cited by examiner

*Primary Examiner* — Chuong T Ho
(74) *Attorney, Agent, or Firm* — Potomac Patent Group PLLC

(57) ABSTRACT

The present invention relates to a link layer control protocol implementation in a communication system. To improve operative efficiency of the link layer control protocol implementation it is suggested to delay issuance of a retransmission request for a missing data unit during a retransmission delay time period. Therefore, according to the present invention a retransmission request is not issued immediately upon detection of a missing data unit. Therefore, the present invention avoids issuance of false alarm for the missing data unit when it is received during the retransmission delay period.

23 Claims, 9 Drawing Sheets

US 8,254,392 B2

LINK LAYER CONTROL PROTOCOL IMPLEMENTATION

RELATED APPLICATIONS

This application claims priority and benefit from International Application No. PCT/EP2007/064062, filed Dec. 17, 2007, which claims priority to Swedish patent application No. 0602760-1, filed Dec. 18, 2006, the entire teachings of which are incorporated herein by reference.

FIELD OF INVENTION

The present invention relates to methods and arrangements in a communication system, in particular to methods and arrangements achieving a link layer control protocol implementation in a communication system.

BACKGROUND OF INVENTION

Generally, the operation of communication systems is based on a hierarchy of protocol implementations. An example is the implementation of a link layer control protocol, e.g., the RLC protocol, being operated on top of a medium access control layer protocol, e.g., the MAC protocol, and providing services to upper layer protocols.

On the link layer control protocol level, automatic repeat request ARQ protocols are used to provide a reliable data transfer in the communication network. Here, when a transmission of one or more data units failed, the receiver may request a retransmission of these data unit(s). Examples of such automatic repeat request ARQ protocols are the link layer control protocols for GPRS, WCDMA, and long term evolution LTE.

Typically, automatic repeat request ARQ protocols provide an in-order delivery of data units carrying a sequence number to upper layer protocols. I.e., upon retransmission of a missing data unit already received those data units with a higher sequence number in comparison to the missing sequence number are not delivered to the higher layer protocol until successful receipt of the missing data unit.

On the level of the medium access control layer protocol being operated under the link layer control protocol, e.g., for HSDPA, there is implemented a multi-process stop-and-wait hybrid automatic repeat request, e.g., according to the HARQ protocol, to perform retransmissions of transport data units that were not correctly received. However, the use of such hybrid automatic repeat request protocols often leads to situations were the medium access control layer receiver receives transport data units out of order with respect to the order of the transport data units at the transmitter side.

Further, the detection of missing data units on the link layer control protocol level, e.g., for the RLC ARQ protocol, relies on an identification of gaps in the sequence number space. If such a gap is identified, the link layer control protocol will trigger a status message to report that one or more data unit(s) is/are missing.

In order to avoid unnecessary issuance of such status reports, the medium access control protocol will provide data units to the link layer control protocol level in order. This minimizes the triggering of unnecessary status reports and consequently avoids a high number of unnecessary retransmissions of data units and related waste of transmission resources.

The re-ordering mechanism on the medium access control protocol level requires a timing mechanism, e.g., the operation of a timer, indicating expiry when further hybrid automatic repeat request retransmissions of a missing transport data unit cannot be expected any more.

Upon expiry, those transport data units that have been received successfully are forwarded to the link layer control protocol level, potential gaps are detected, and finally missing data units are requested to be retransmitted by the link layer control protocol.

However, the existing solution outlined above requires the use of multiple sequence numbers for each protocol layer implementation.

On the medium access control protocol level there are used transport sequence numbers with respect to transport data units. They are used to put transport data units or blocks back into order if hybrid automatic repeat request retransmissions led to a reordering thereof.

Further, on the link layer control protocol level there are used sequence numbers for the operation of the automatic repeat request ARQ protocol to achieve in order delivery of received data units to upper layer protocol levels, which implies significant overhead.

SUMMARY OF INVENTION

In view of the above, the technical problem underlying the present invention is to improve operative efficiency of a link layer control protocol implementation operated on top of a medium access control layer protocol and providing services to an upper layer protocol.

According to the present invention this technical object is achieved by a method of implementing the link layer control protocol having the features of receiving data units, reordering, and reassembling them, starting a first timer upon detection of a missing data unit, and starting a second timer triggered by issuance of a retransmission request, as discussed in greater detail below.

The method comprises a first step of receiving data units from the medium access control protocol, a second step of reordering data units provided by the medium access control layer protocol out of sequence, and a third step of reassembling data units in sequence for forwarding of service data units to the upper layer protocol. Further, the method comprises a step of starting a first timer to delay issuance of a retransmission request or in other words a status message for a missing data unit from the link layer control protocol. Here the step of starting the first timer is triggered by detection of the missing data unit.

An important advantage of the present invention is that a retransmission request is not issued immediately upon detection of a missing data unit. Therefore, should a missing data unit be received through a hybrid automatic repeat request retransmission on the medium access control layer it may be forwarded to the link layer control without issuance of a retransmission request from the link layer control protocol implementation level.

In other words, according to the present invention it is suggested to introduce a first guard time interval that is also referred to a retransmission delay period in the following. This guard time interval allows to avoid false alarm issuance from the missing data unit detection functionality on the link layer control protocol level.

According to a further preferred embodiment of the present invention there is started a second timer triggered by detection of the missing data unit. According to another preferred embodiment of the present invention the start of the second timer may be triggered by issuance of the retransmission request for the missing data unit from the link layer control protocol. An important advantage of this preferred embodiment of the present invention is the realization of a second guard time interval also referred to missing data completion period in the following. The purpose of this second guard time is, if QoS prevail for the upper layer, to wait for retransmissions of missing data units and to avoid out-of order delivery of data units to the upper layer.

In other words data units having a higher sequence number as a missing data unit are not delivered to the upper layer until expiry of the second timer. This prevents protocol stalling if not all data units have been received on the link layer control protocol level within a reasonable time.

Yet another important advantage of the use of a two-stage timer configuration for the link layer control protocol implementation is that it enables to detect missing data units, to require related retransmissions, to reorder data units, and to deliver them in sequence to the upper layers within the link layer control implementation thus avoid the need for two different sequence number. Therefore, according to the present invention the use of transport sequence numbers for the medium access control layer protocol implementation becomes obsolete which decreases header overhead significantly.

According to a further preferred embodiment of the present invention the first timer is identical to the second timer.

This preferred embodiment of the present invention reduces a complexity of the link layer control protocol implementation when the start of the second timer may be triggered by issuance of the retransmission request for a missing data unit from the link layer control protocol.

According to a further preferred embodiment of the present invention the first timer is stopped upon receipt of the missing data unit from the medium access control protocol prior to expiry of the first timer, followed by reordering and reassembling of data units.

This preferred embodiment of the present invention is advantageous in that it minimizes a use of processing resources on the link layer control protocol level.

According to a further preferred embodiment of the present invention the retransmission request is issued for the missing data unit from the link layer control protocol triggered by expiry of the first timer.

As outlined above, the delay of issuing the retransmission request avoids wasting transmission resources due to unnecessary retransmissions of data units which arrives at the receiver side within the first guard interval or equivalently within the retransmission delay period.

According to a further preferred embodiment of the present invention the first timer is restarted triggered by issuance of the retransmission request to delay issuance of a further retransmission request for the missing data unit from the link layer control protocol.

An important advantage of this preferred embodiment of the present invention is that through appropriate operation of the first timer the issuance of retransmission request may be repeated within the time frame of the second guard interval or the missing data completion period to maximize chances for successful retransmissions. Also, the further retransmission request may be an update of the initially issued retransmission request to better reflect a current operative state in the link layer control protocol implementation.

According to a further preferred embodiment of the present invention the step of reordering data units and the step of reassembling data units is executed in consideration of successfully received data units upon termination of the retransmission process.

An important advantage of this preferred embodiment of the present invention is that the reordering and reassembly does not necessarily depend on the success of the retransmission process. Therefore, the reordering and reassembly may be executed with successfully received data units leaving it to the upper layer how to deal with missing data units. As an alternative, it is also possible to forward only a subset of successfully received data units to the upper layer, e.g., those preceding a missing data unit.

According to a further preferred embodiment of the present invention there is executed a step of advancing a lower edge of a receiver window upon termination of the retransmission process, i.e. at expiry of the second guard timer, without receipt of the missing data unit.

An important advantage of this preferred embodiment of the present invention is that a sequence number associated with a missing data unit is no longer covered by the receiver window any longer. As a consequence, the missing data unit would be ignored by the link layer control implementation should it still be delivered by the medium access control layer implementation at a later point in time.

According to a further preferred embodiment of the present invention an acknowledgement status report with respect to the missing data unit is send to a transmitter of the missing data unit upon termination of the retransmission process without receipt of the missing data unit.

This preferred embodiment of the present invention is advantageous in that it finally terminates operation for delivery of the missing data unit at the transmitter side and there waste of transmission resources.

According to a further preferred embodiment of the present invention there is executed a step of setting the first timer to delay issuance of a retransmission request according to a maximum number of allowed retransmissions for the medium access control protocol.

This preferred embodiment of the present invention is advantageous in that it minimizes the first guard time interval for delay of issuance of the retransmission request.

According to a further preferred embodiment of the present invention the expiry of the second timer is set according to at least one service requirement of at least one application using services provided by the link layer control protocol, e.g., the packet delay budget.

This preferred embodiment of the present invention is advantageous it optimizes the link layer control protocol implementation in view of service requirements prevailing for the upper layer and related applications and/or services, e.g., Quality of Service QoS requirements.

According to a further aspect of the present invention the technical object outlined above is achieved by an apparatus for implementing a link layer control protocol being operated on top of a medium access control layer protocol and providing services to an upper layer protocol having the features of a data receiving unit adapted to receive data units from the medium access control protocol, a data reordering unit adapted to reorder data units provided by the medium access control layer protocol out of sequence, a data reassembling unit adapted to reassemble data units in sequence for forwarding of service data units to the upper layer protocol, a first timer adapted to be started to delay issuance of a retransmission request for a missing data unit from the link layer control protocol triggered by detection of the missing data unit until expiry of the first timer, and a second timer adapted to be started as triggered by issuance of the retransmission request for the missing data unit from the link layer control protocol.

Preferred embodiments of the apparatus for implementing a link layer control protocol include the first timer being identical to the second time, among other features.

It should be noted that similar advantages as outlined above with respect to the method of implementing the link layer control protocol also exist with respect to the apparatus for implementing the link layer control protocol according to the present invention.

According to a further aspect of the of the present invention the technical object outlined above is achieved by a computer program product directly loadable into a memory operated with respect to a link layer control protocol implementation comprising software code portions for performing the inventive link layer control protocol process when the product is run on a processor of a receiver.

Therefore, the present invention is also provided to achieve an implementation of the inventive method steps on computer or processor systems. In conclusion, such implementation leads to the provision of computer program products for use with a computer system or more specifically a processor comprised in e.g., a receiver. This programs defining the functions of the present invention can be delivered to a computer/processor in many forms, including, but not limited to information permanently stored on non-writable storage media, e.g., read only memory devices such as ROM or CD ROM discs readable by processors or computer I/O attachments; information stored on writable storage media, i.e. floppy discs and hard drives; or information convey to a computer/processor through communication media such as network and/or telephone networks via modems or other interface devices. It should be understood that such media, when carrying processor readable instructions implementing the inventive concept represent alternate embodiments of the present invention.

BRIEF DESCRIPTION OF DRAWING

In the following the best mode and preferred embodiments of the present invention will be described with reference to the drawing in which.

DESCRIPTION OF BEST MODE AND PREFERRED EMBODIMENTS

Figure 1:
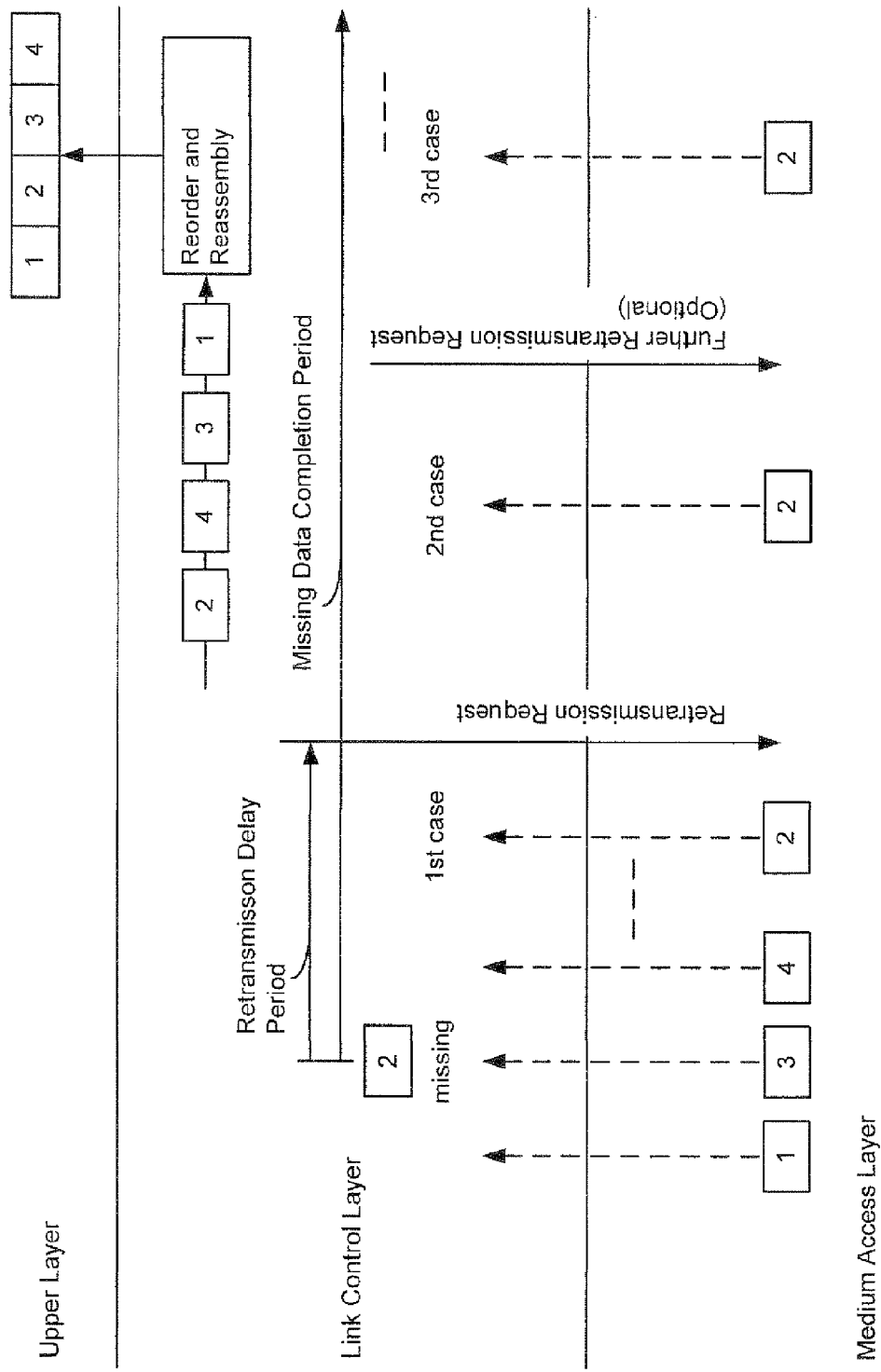
FIG. 1 shows an illustrative overview for the link layer control protocol implementation according to the present invention.

In the following, the best mode of carrying out the invention as well as preferred embodiments thereof will be described through reference to the drawing. Here, insofar as different functionalities of the present invention are described, it should be clear that such functionality may be achieved either in hardware, in software, or through a combination thereof.

FIG. 1 shows an illustrative overview for the link layer control protocol implementation according to the present invention.

Initially, it should be mentioned that medium access layer transport data units do not carry a transport sequence number, as outlined above. Insofar as FIG. 1 shows sequence numbers, these are used for illustrative purposes only. Typically a medium access layer transport data unit contains one or more link layer control data units, e.g., a protocol data unit PDU for the radio link control RLC, e.g., for different link layer control data flows, e.g., typically one link layer control data unit per flow. One exception is when link layer control retransmission is performed. In that case the medium access control layer transport data unit might contain two or more link layer control data units per flow.

As shown in FIG. 1, on the level of the link layer control protocol implementation there are received different link layer control data units also referred to as data units in short in the following.

As shown in FIG. 1, upon receipt of the $3^{rd}$ data unit subsequent to the $1^{st}$ data unit, on the level of the link layer control protocol implementation it becomes clear that the transmission of the $2^{nd}$ data unit failed so far. In view of this, conventionally a retransmission request would be issued from the link layer control protocol implementation to request retransmission of the $2^{nd}$ data unit. To the contrary, according to the present invention there is triggered a first guard interval also referred to as retransmission delay period in the following, e.g., through start of a first timer, to delay issuance of the retransmission request with respect to the $2^{nd}$ data unit.

Preferably, the first guard time interval is initialized according to the maximum number of retransmission on the medium access control layer level. However, depending on the specifics of the medium access control layer protocol being used, optimizations are possible to keep the first guard time as short as possible.

As shown in FIG. 1, the purpose of triggering the first guard interval in the link layer control protocol implementation is to wait for potential medium access control layer retransmission of the missing $2^{nd}$ data unit, e.g., through hybrid automatic repeat request HARQ retransmission. If the missing $2^{nd}$ data unit arrives in time before the first guard interval expires, the successfully received data units are reordered and reassembled so as to forward service data units to the upper layer.

As shown in FIG. 1, besides the first guard time interval according to the present invention there is also provided the application of a second guard time interval also referred to as missing data completion period in the following. For the example shown in FIG. 1, the second guard time interval is started parallel to the first guard time interval.

As shown in FIG. 1, the second guard time interval is required when a hybrid automatic repeat request HARQ retransmission for the $2^{nd}$ data unit could not be completed within the first guard time interval, e.g., because the maximum number of hybrid automatic repeat request HARQ retransmissions is reached or because the retransmission process stopped for some other reason.

As shown in FIG. 1, upon expiry of the first guard time interval, a retransmission request for the missing data unit is issued from the link layer control protocol implementation to the medium access control layer implementation. For this constellation the second guard time interval, e.g., implemented in the link layer control protocol implementation through operation of a second timer, is triggered to ensure that the link layer control protocol implementation waits with a forwarding of already received data units to the upper layer.

The reason for this is that upon issuance of the retransmission request, e.g., an ARQ for RLC, the already received data units should not be reordered and reassembled as far as possible, and the related service data units should not be forwarded to upper layers, since the link layer control protocol implementation is supposed to deliver service data units in sequence.

Figure 2:
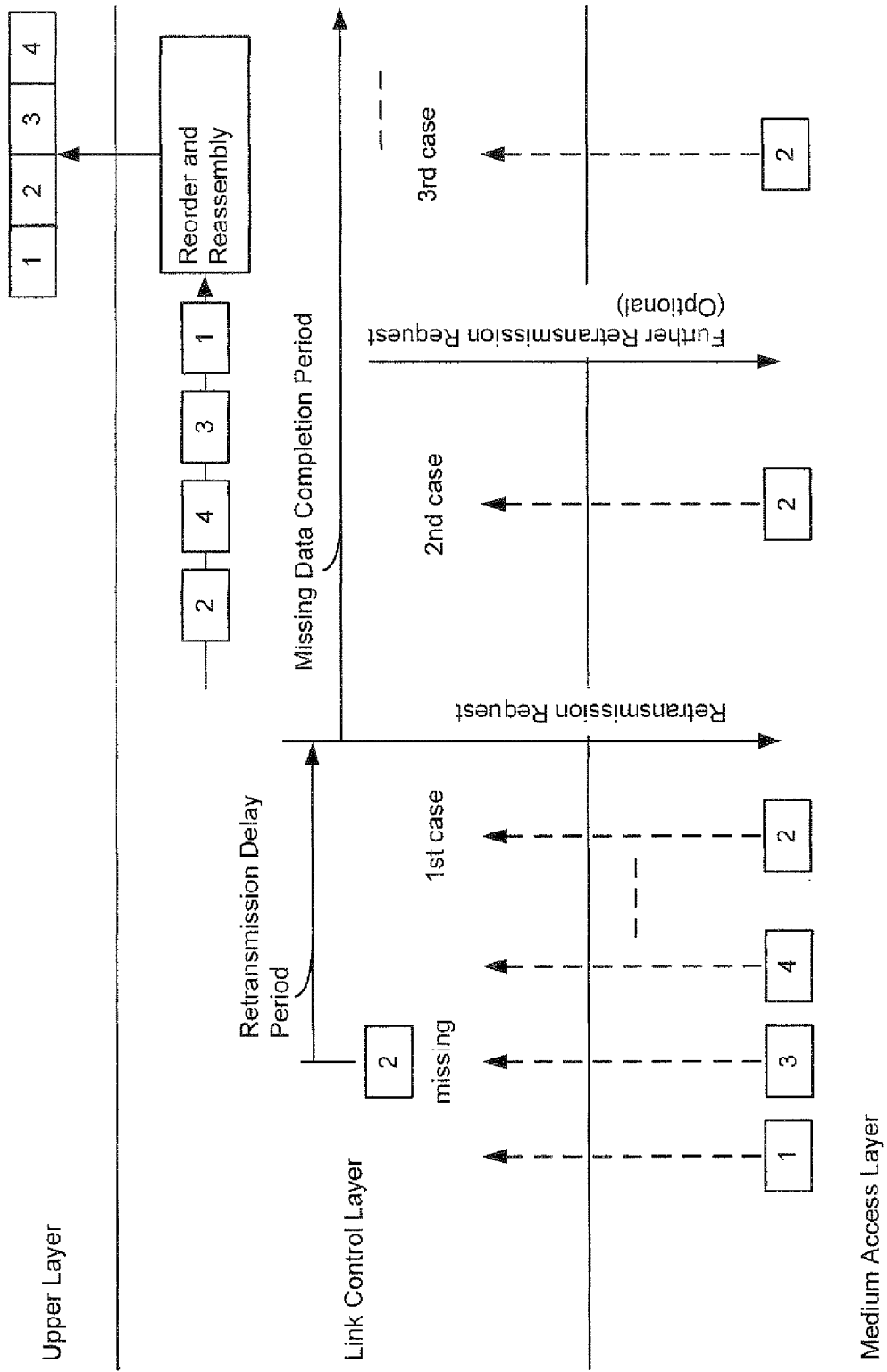
FIG. 2 shows a further illustrative overview for the link layer control protocol implementation according to the present invention.

FIG. 2 shows a further illustrative overview for the link layer control protocol implementation according to the present invention.

As shown in FIG. 2, the difference between the link layer control protocol implementations shown in FIGS. 1 and 2 is the trigger for start of the second timer. According to FIG. 1 the second guard time interval is started parallel to the first guard time interval while according to FIG. 2 the second guard time interval is started upon expiry of the first guard time interval. Therefore the first guard timer and the second timer may be implemented using a single timer.

As shown in FIG. 2, upon successful receipt of the missing $2^{nd}$ data unit prior to expiry of the first guard interval, the second guard interval is not triggered at all.

Irrespective of whether a link layer control protocol implementation according to FIG. 1 or FIG. 2 is selected, it should be noted that the requirement of in-sequence delivery to the upper layer does not imply that received data units should be stored on the link layer control protocol level for a very long time. Depending on QoS requirements, the data units and related service data units set up from the data units have typically a certain lifetime and should be delivered to the receiving application. Thus, the second guard interval should be configured according to the needs of the application that is served by the link layer control protocol implementation.

E.g., the transmission control protocol TCP is very vulnerable to packet re-ordering and in that case one should wait for successful data retransmission, optionally potentially also for two or three, as shown in FIGS. 1 and 2, before data is delivery to the upper layer. In view of this, a relatively large second guard time interval could be chosen, e.g., 200 ms. On the other hand Voice over IP VoIP has more stringent delay requirements so that in this case the second guard time interval could be configured with a much lower value or even not be used at all when service data units can be delivered out of order.

As outlined above with respect to FIGS. 1 and 2 and explained in more detail in the following with respect to FIGS. 3 to 13, the present invention suggests to use a two-stage guard time configuration for link layer control protocol implementations. The first guard time provides a guard interval for hybrid automatic repeat request, e.g., HARQ, retransmissions to arrive before trigger of automatic repeat request, e.g., ARQ, from the link layer control protocol implementation. The second guard time interval assures, if quality of service QoS requirements prevail, to wait for at least one automatic repeat request ARQ retransmission before data is delivered to the upper layer, e.g., even out of order.

Figure 3:
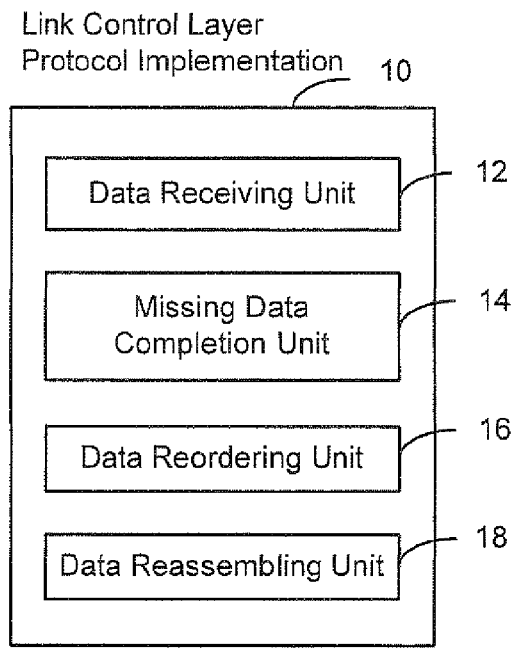
FIG. 3 shows a schematic diagram of a link layer control protocol implementation according to the present invention.

FIG. 3 shows a schematic diagram of a link layer control protocol implementation according to the present invention.

As shown in FIG. 3, the link layer control protocol implementation 10 comprises a data receiving unit 12, a missing data completion unit 14, a data reordering unit 16, and a data reassembling unit 18.

Figure 4:
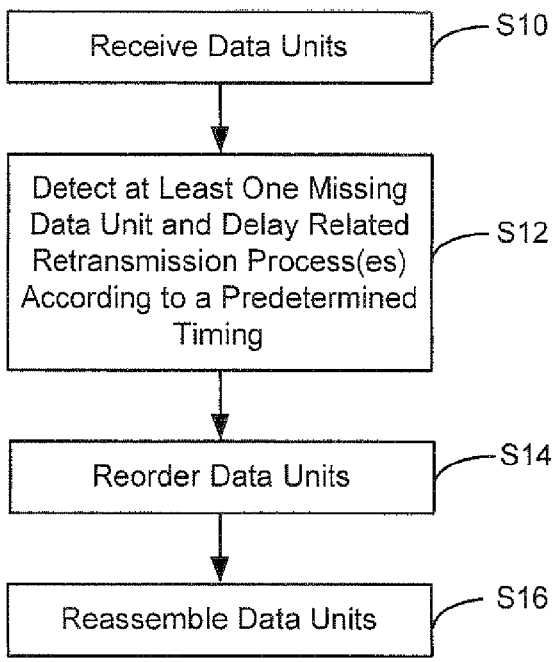
FIG. 4 shows a flowchart of operation for the link layer control protocol implementation shown in FIG. 3.

FIG. 4 shows a flowchart of operation for the link layer control protocol implementation shown in FIG. 3. As shown in FIG. 4, a step S10, operatively executed by the data receiving unit 12, serves to receive data units from the medium access control protocol.

As shown in FIG. 4, a step S12, operatively executed by the missing data completion unit 14, serves to detect at least one missing data unit and to delay related retransmission process(es) according to a predetermined timing, i.e., the first guard time interval. As outlined above, this may be achieved by starting a first timer to delay issuance of a retransmission request for a missing data unit from the link layer control protocol triggered by detection of the missing data unit until expiry of the first timer.

As shown in FIG. 4, a step S14, operatively executed by the data reordering unit 12, serves to reorder data units provided by the medium access control layer protocol out of sequence.

As shown in FIG. 4, a step S16, operatively executed by the data reassembling unit 18, serves to reassemble data units in sequence for forwarding of service data units to the upper layer protocol.

Figure 5:
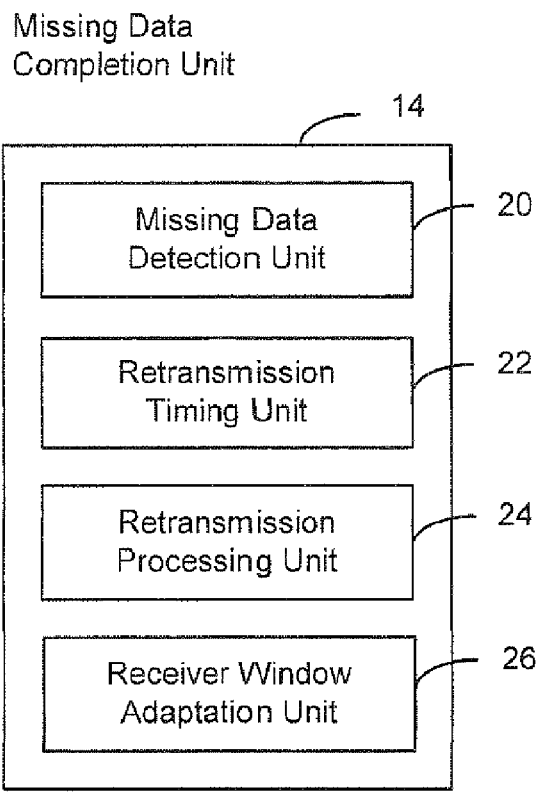
FIG. 5 shows a further detailed schematic diagram of the missing data completion unit shown in FIG. 3.

FIG. 5 shows a further detailed schematic diagram of the missing data completion unit shown in FIG. 3.

As shown in FIG. 5, the missing data completion unit 14 comprises a missing data detection unit 20, a retransmission timing unit 22, a retransmission processing unit 24, and a receiver window adaptation unit 26.

Figure 6:
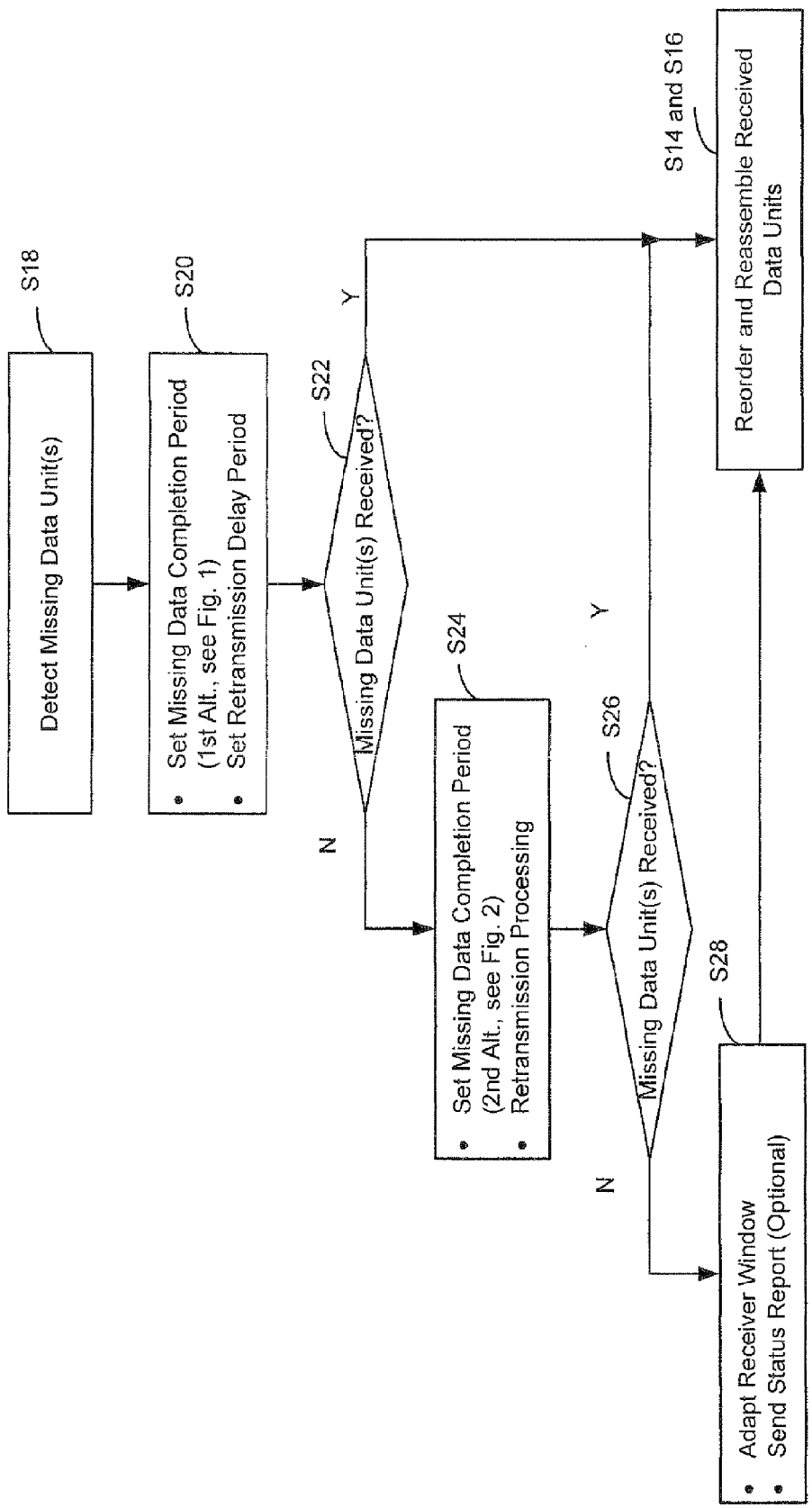
FIG. 6 shows a further detailed flowchart of operation for the retransmission timing unit and the retransmission processing unit shown in FIG. 5.

FIG. 6 shows a further detailed flowchart of operation for the retransmission timing unit and the retransmission processing unit shown in FIG. 5.

As shown in FIG. 6, a step S18, operatively executed by the missing data detection unit 20, serves to detect at least one missing data unit on the link layer control protocol level.

As shown in FIG. 6, a step S20, operatively executed by the retransmission timing unit 22, serves to set the first guard interval or equivalently the retransmission delay period. Optionally, as outlined above with respect to the FIG. 1, at this stage of operation also the second guard time interval or equivalently the missing data completion period may be set. If this is the case, the second guard time period will not be set again in a step S24 to be described in the following.

For the setting of the first guard time interval the following examples may be given. It should be noted that these examples are clearly non-binding for the scope of protection of the present invention.

According to a first example, the medium access control protocol is a synchronous protocol and the expiry of the first guard time period is set by subtracting a value of one from the maximum number of allowed retransmissions for the medium access control protocol; and by multiplying the subtraction result with the medium access control protocol round trip time.

According to a second example, the medium access control protocol is an asynchronous protocol and the expiry of the first guard time period is set by subtracting a value of one from the maximum number of allowed retransmissions for the medium access control protocol; by multiplying the subtraction result with the medium access control protocol round trip time; and by adding a guard interval to the multiplication result for compensation of scheduling delays.

According to a third example, the medium access control protocol is an asynchronous protocol and the expiry of the first guard time period is set by subtracting a value of one from the maximum number of allowed retransmissions for the medium access control protocol; and by multiplying the subtraction result with the defined maximum delay for retransmission.

As shown in FIG. 6, irrespective of how the first guard time period is set, at expiry thereof a step S22, operatively executed by the retransmission processing unit 24, to interrogate whether missing data units have been received. In the affirmative case there follows reordering and reassembly of data units for forwarding of service data units to receiving applications running on the upper layer.

As shown in FIG. 6, should the interrogation in step S22 lead to a negative result, there follows a step S24, operatively executed by the retransmission processing unit, to trigger and initiate retransmission processing. When the second guard time period is not set in step S20, then step S 24 serves also to then set the second guard time at a later stage of operation of link layer control implementation, as shown in FIG. 2. As alternative, the setting of the second guard time period in step S24 may be operatively executed by the retransmission timing unit 22 instead of the retransmission processing unit 24.

As shown in FIG. 6, a step S26, operatively executed by the retransmission processing unit 24, serves to interrogate whether missing data units have been received after triggering of retransmission processing. In the affirmative case there follows reordering and reassembly of data units for forwarding of service data units to receiving applications running on the upper layer.

As shown in FIG. 6, should the interrogation in step S26 lead to a negative result, there follows a step S28, operatively executed by the receiver window adaptation unit 26 to advance a lower edge of a receiver window upon termination of the retransmission process without receipt of the missing data unit. As an option, the step S28 also serves to send an acknowledgement status report with respect to the missing data unit to a transmitter of the missing data unit upon termination of the retransmission process without receipt of the missing data unit. Then, the transmitter side will stop retransmission of the missing data units.

It should be noted, that the operation of the missing data completion unit as shown in FIG. 6 may be iterated with respect to the issuance of a retransmission request and as shown in FIGS. 1 and 2. Preferably, with each issuance of a retransmission request the first guard time period my be re-initiated, while the second guard time period is initiated only once.

Figure 7:
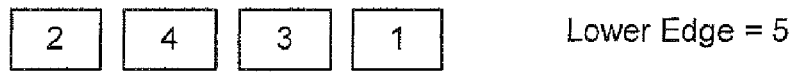
FIG. 7 shows an example for a receiver window adaptation achieved by the receiver window adaptation unit shown in FIG. 5.
Figure 7:

FIG. 7 shows an example for a receiver window adaptation achieved by the receiver window adaptation unit shown in FIG. 5.

As shown in FIG. 7 and outlined above, upon successful receipt of data units the receiver window RW may be set to a specific value, e.g., a value of five according to the next expected data unit. Should a missing data unit, e.g., the $2^{nd}$ data unit not be retransmitted successfully, then the receiver window is modified by advancing the lower edge thereof to a value of two. In view of this, even when the missing data unit is successfully retransmitted at a later stage of operation, it would be ignored at the receiver side.

Figure 8:
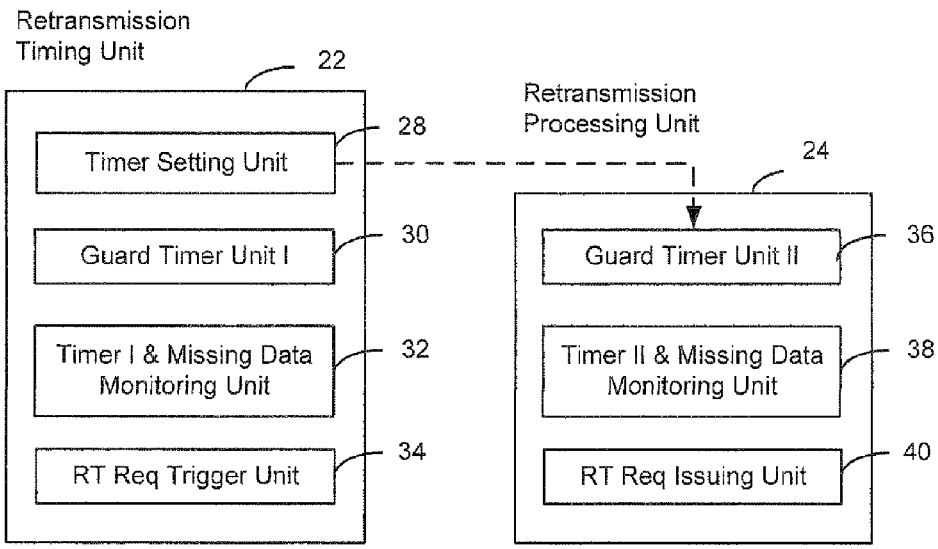
FIG. 8 shows a further detailed schematic diagram of the retransmission timing unit and the retransmission processing unit shown in FIG. 5.

FIG. 8 shows a further detailed schematic diagram of the retransmission timing unit and the retransmission processing unit shown in FIG. 5.

As shown in FIG. 8, the retransmission timing unit 22 comprises a timer setting unit 28, a first guard timer unit 30, a first timer and missing data monitoring unit 32, and a retransmission trigger unit 34.

As shown in FIG. 8, the retransmission processing unit comprises a second guard timer unit 36, a second timer and missing data monitoring unit 38, and a retransmission issuing unit 40. It should be noted, that while FIG. 8 shows the timer setting unit 28 as part of the retransmission timing unit 22, the timer setting unit 28 may also form part of the retransmission processing unit 24.

Figure 9:
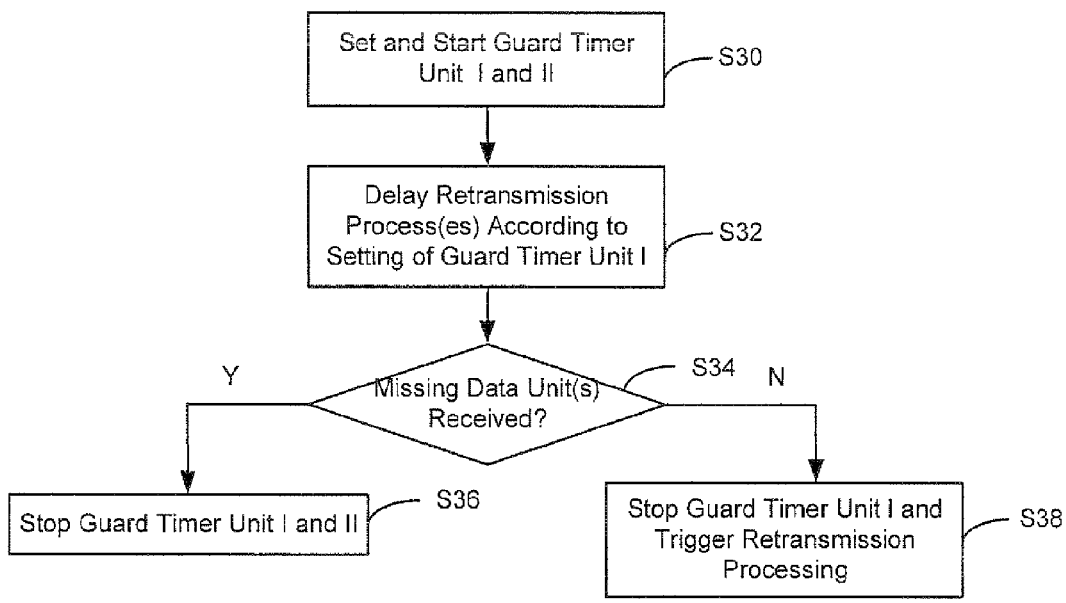
FIG. 9 shows a flowchart of operation for the retransmission timing unit shown in FIG. 8.

FIG. 9 shows a flowchart of operation for the retransmission timing unit shown in FIG. 8.

As shown in FIG. 9, a step S30, operatively executed by the timer setting unit 28, serves to set and start the first guard timer unit 30 and at the same time also the second guard timer unit 36 in the retransmission processing unit 24, to realize the link control protocol implementation as outlined above with respect to FIG. 1.

As shown in FIG. 9, a step S32, operatively executed by the first guard timer unit 30, serves to delay issuance of a retransmission request until expiry of the first guard time period.

As shown in FIG. 9, a step S34, operatively executed by the first timer and missing data monitoring unit 32, serves to interrogate whether missing data unit(s) have been received prior to expiry of the first guard timer period.

As shown in FIG. 9, when missing data unit(s) have been received prior to expiry of the first guard timer period, there follows a step S36, operatively executed by the first guard timer unit 30 and the second guard timer unit 36 to stop these timers.

As shown in FIG. 9, when missing data unit(s) have not been received prior to expiry of the first guard timer period, there follows a step S38, operatively executed by the first guard timer unit 30 and the retransmission trigger unit 34 to stop the first guard timer unit 30 and to trigger retransmission processing.

Figure 10:
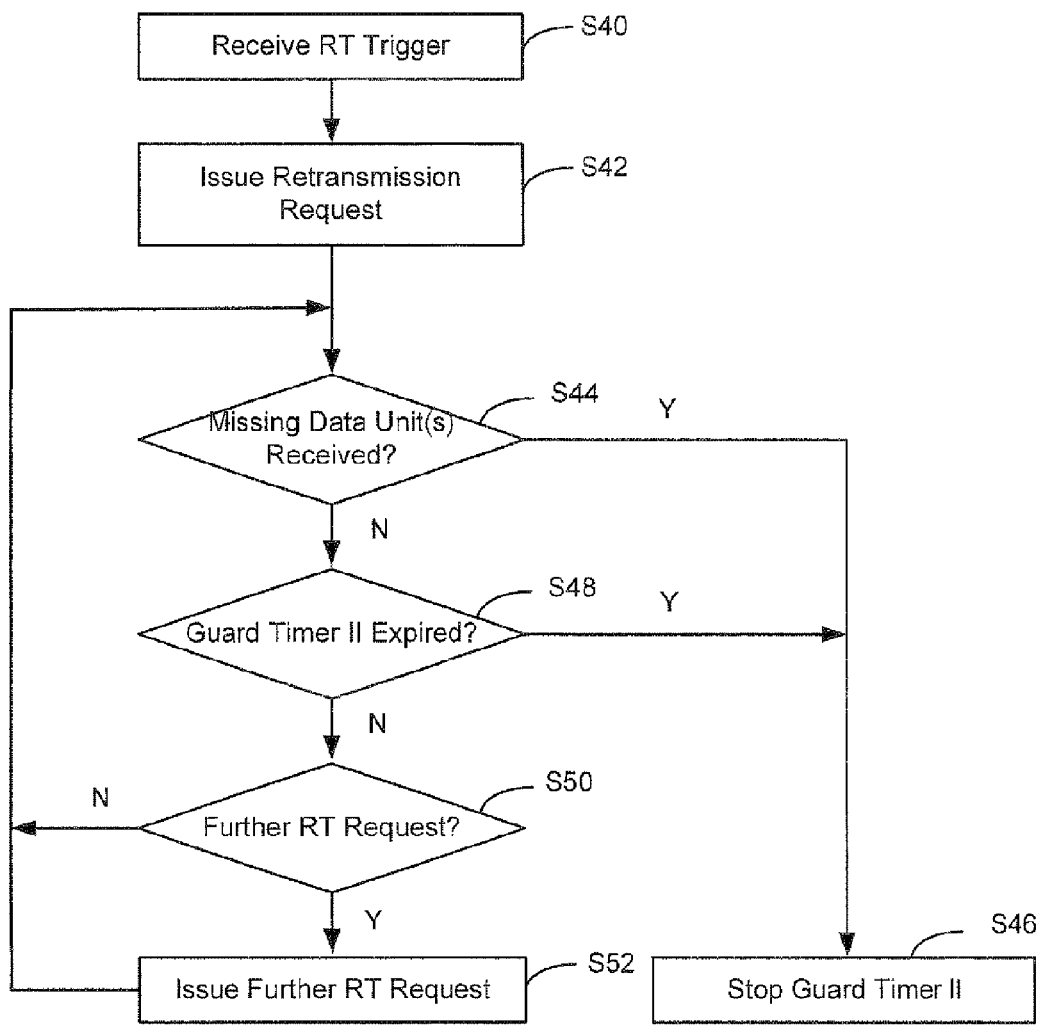
FIG. 10 shows a flowchart of operation for the retransmission processing unit shown in FIG. 8.

FIG. 10 shows a flowchart of operation for the retransmission processing unit shown in FIG. 8.

As shown in FIG. 10, a step S40, operatively executed by the retransmission unit 40, serves to receive the retransmission processing trigger from the retransmission timing unit 22 at the retransmission processing unit. Further, a step S42, operatively executed by the retransmission unit 40, serves to issue the retransmission request from the link layer control to the medium access layer, as outlined above.

As shown in FIG. 10, subsequent to issuance of a retransmission request in step S42, there follows a step S44, operatively executed by the second timer and missing data monitoring unit 38 to interrogate whether at least one missing data unit has been received through retransmission processing. In the affirmative case, there follows a step S46, operatively executed by the second guard timer unit 36, that serves to stop the second guard timer unit 36.

As shown in FIG. 10, when missing data units have not been received through retransmission processing, there follows a step S48, operatively executed by the second timer and missing data monitoring unit 38, to interrogate whether the second guard timer unit 36 has expired. In the affirmative case the processing proceeds to step S46.

As shown in FIG. 10, when the second guard timer unit 36 has not expired there follows a step S50, operatively executed by the retransmission issuing unit 40, to interrogate whether a further retransmission request should be issued. If this not the case, the processing shown in FIG. 10 branches back to step S44, while otherwise there follows a step S52, operatively executed by the retransmission issuing unit 40, to issue a further retransmission request prior to branching back to step 544.

Figure 11:
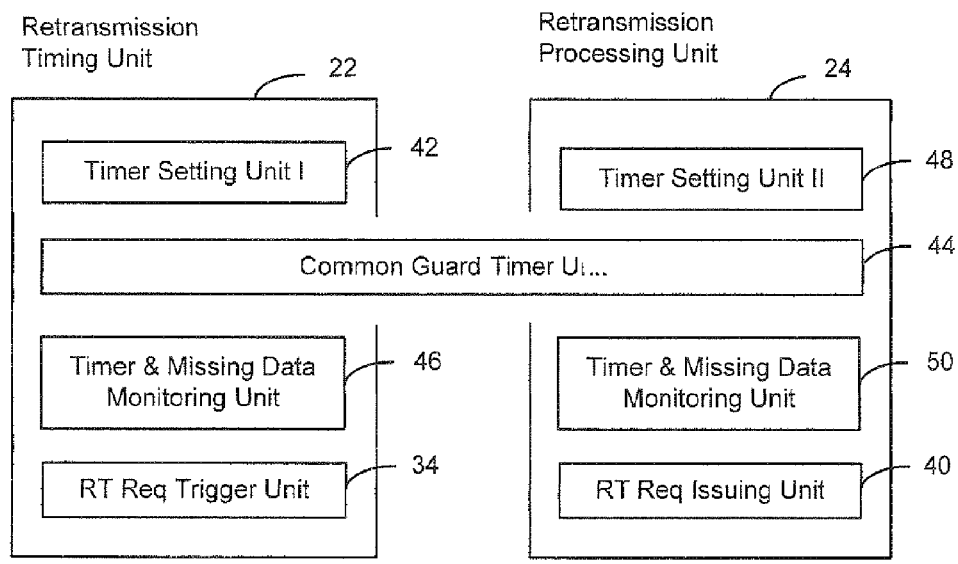
FIG. 11 shows a further detailed schematic diagram of the retransmission timing unit and the retransmission processing unit shown in FIG. 5.

FIG. 11 shows a further detailed schematic diagram of the retransmission timing unit and the retransmission processing unit shown in FIG. 5. The configuration shown in FIG. 11 is different from the configuration shown in FIG. 8 in that instead if two different timers only one common timer is used. Also, while FIG. 11 shows two different timer setting units, it should be understood that also these different timer setting units may be integrated into a single common timer setting unit.

As shown in FIG. 11, the further realization of the retransmission timing unit 22 comprises a first timer setting unit 28, has access to a common guard timer unit 44, and further comprises a first common timer and missing data monitoring unit 46, and the retransmission trigger unit 34.

As shown in FIG. 11, the further realization of the retransmission processing unit 24 comprises a second timer setting unit 48, has access to the common guard timer unit 44, and further comprises a second common timer and missing data monitoring unit 38, and the retransmission issuing unit 40.

Figure 12:
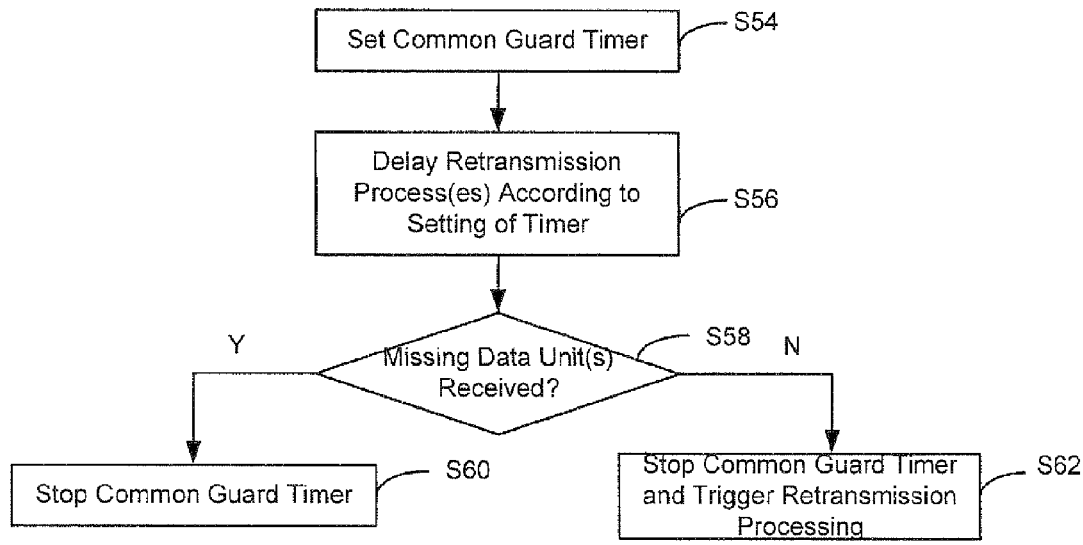
FIG. 12 shows a flowchart of operation for the retransmission timing unit shown in FIG. 11.

FIG. 12 shows a flowchart of operation for the retransmission timing unit shown in FIG. 11.

As shown in FIG. 12, a step S34, operatively executed by the first timer setting unit 42, serves to set and start the common guard timer unit 30 with respect to the first guard time interval, to realize the link control protocol implementation as outlined above with respect to FIG. 2.

As shown in FIG. 12, a step S56, operatively executed by the common guard timer unit 44, serves to delay issuance of a retransmission request until expiry of the first guard time period.

As shown in FIG. 12, a step S58, operatively executed by the first common timer and missing data monitoring unit 46, serves to interrogate whether missing data unit(s) have been received prior to expiry of the first guard timer period.

As shown in FIG. 12, when missing data unit(s) have been received prior to expiry of the first guard timer period, there follows a step S60, operatively executed by the common guard timer unit 44 to stop the common guard timer.

As shown in FIG. 12, when missing data unit(s) have not been received prior to expiry of the first guard timer period, there follows a step S62, operatively executed by the common guard timer unit 44 and the retransmission trigger unit 34 to stop the common guard timer unit 44 and to trigger retransmission processing.

Figure 13:
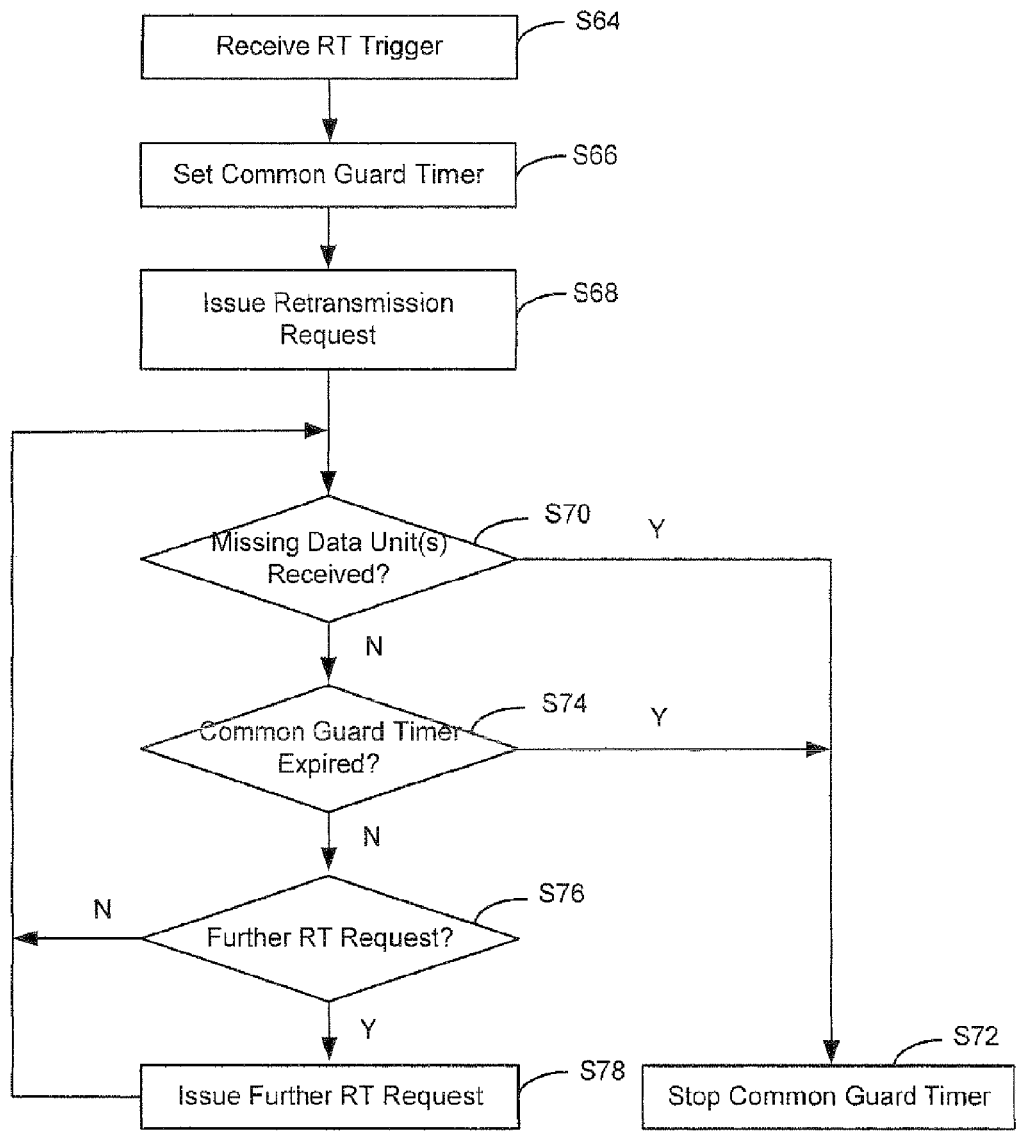
FIG. 13 shows a flowchart of operation for the retransmission processing unit shown in FIG. 11.

FIG. 13 shows a flowchart of operation for the retransmission processing unit shown in FIG. 11.

As shown in FIG. 13, a step S64, operatively executed by the retransmission unit 40, serves to receive the retransmission processing trigger from the retransmission timing unit 22 at the retransmission processing unit.

As shown in FIG. 13, a step S64, operatively executed by the second timer setting unit 48, serves to set the common guard timer unit 44 with respect to the second guard interval.

As shown in FIG. 13, a step S68, operatively executed by the retransmission unit 40, serves to issue the retransmission request from the link layer control to the medium access layer, as outlined above.

As shown in FIG. 13, subsequent to issuance of a retransmission request in step S68, there follows a step S70, operatively executed by the common timer and missing data monitoring unit 50 to interrogate whether at least one missing data unit has been received through retransmission processing. In the affirmative case, there follows a step S72, operatively executed by the common guard timer unit 44, that serves to stop the common guard timer unit 44.

As shown in FIG. 13, when missing data units have not been received through retransmission processing, there follows a step S74, operatively executed by the second common timer and missing data monitoring unit 50, to interrogate whether the common guard timer unit 44 has expired. In the affirmative case the processing proceeds to step S72.

As shown in FIG. 13, when the common guard timer unit has not expired there follows a step S76, operatively executed by the retransmission issuing unit 40, to interrogate whether a further retransmission request should be issued. If this not the case, the processing shown in FIG. 10 branches back to step S70, while otherwise there follows a step S78, operatively executed by the retransmission issuing unit 40, to issue a further retransmission request prior to branching back to step S70.

While above the best mode and preferred embodiments of the present invention have been described it should be understood that further modifications and variations are well covered by the scope of the present invention.

E.g., instead of using a common guard timer or a first and second guard timer, according to the present invention it is also envisaged to use one guard timer per missing data unit. This simplifies the complexity of retransmission timing at the cost of memory and processing power.

Further, it should be noted that the implementation of guard timer may be achieved according to any appropriate implementation, without being bound to a specific type of guard timer. E.g., implementations of guard timers may rely on handling of events, the storage of a start time in combination with a method comparing the start time with a current time, etc.

Further, the link layer control protocol implementation may deliver service data units to upper layers in arbitrary order, e.g., immediately once they are received. The second guard timer would then only be used to advance the lower edge of the receiver window.

The invention claimed is:

1. A method of implementing a link layer control protocol being operated on top of a medium access control layer protocol and providing services to an upper layer protocol, comprising the steps:
   receiving data units from the medium access control protocol;
   reordering data units provided by the medium access control layer protocol out of sequence;
   reassembling data units in sequence for forwarding of service data units to the upper layer protocol;
   comprising:
   starting a first timer to delay issuance of a retransmission request for a missing data unit from the link layer control protocol triggered by detection of the missing data unit until expiry of the first timer; and
   starting a second timer triggered by issuance of the retransmission request for the missing data unit from the link layer control protocol.

2. The method according to claim 1, characterized in that the first timer is identical to the second timer.

3. The method according to claim 1, characterized in that it comprises a step of starting a second timer triggered by detection of the missing data unit.

4. The method according to claim 1, comprising a step of stopping the first timer upon receipt of the missing data unit from the medium access control protocol prior to expiry of the first timer, followed by reordering and reassembling of data units.

5. The method according to claim 1, comprising a step of issuing the retransmission request for the missing data unit from the link layer control protocol triggered by expiry of the first timer.

6. The method according to claim 5, comprising a step of restarting the first timer triggered by issuance of the retransmission request to delay issuance of a further retransmission request for the missing data unit from the link layer control protocol.

7. The method according to claim 1, wherein the step of reordering data units and the step of reassembling data units is executed in consideration of successfully received data units upon termination of the retransmission process.

8. The method according to claim 7, comprising a step of advancing a lower edge of a receiver window upon termination of the retransmission process without receipt of the missing data unit.

9. The method according to claim 7, comprising a step of sending an acknowledgement status report with respect to the missing data unit to a transmitter of the missing data unit upon termination of the retransmission process without receipt of the missing data unit.

10. The method according to claim 1, comprising a step setting the first timer to delay issuance of a retransmission request according to a maximum number of allowed retransmissions for the medium access control protocol.

11. The method according to claim 1, comprising a step of setting the expiry of the second timer upon issuance of the retransmission request for the missing data unit from the link layer control protocol according to at least one service requirement of at least one application using services provided by the link layer control protocol.

12. A computer program product directly loadable into the internal memory of a communication receiver, comprising software code portions for performing the steps of claim 1, when the product is run on a processor of the communication receiver.

13. An apparatus implementing a link layer control protocol being operated on top of a medium access control layer protocol and providing services to an upper layer protocol, comprising:
    a data receiving unit adapted to receive data units from the medium access control protocol;
    a data reordering unit adapted to reorder data units provided by the medium access control layer protocol out of sequence; and
    a data reassembling unit adapted to reassemble data units in sequence for forwarding of service data units to the upper layer protocol;
    comprising a first timer adapted to be started to delay issuance of a retransmission request for a missing data unit from the link layer control protocol triggered by detection of the missing data unit until expiry of the first timer and a second timer adapted to be started as triggered by issuance of the retransmission request for the missing data unit from the link layer control protocol.

14. The apparatus according to claim 13, wherein the first timer is identical to the second timer.

15. The apparatus according to claim 13, wherein the second timer is adapted to be started as triggered by detection of the missing data unit.

16. The apparatus according to claim 13, wherein the first timer is adapted to stop timing operation upon receipt of the missing data unit from the medium access control protocol prior to expiry of the first timer.

17. The apparatus according to claim 13, comprising a retransmission request issuing unit adapted to issue the retransmission request for the missing data unit from the link layer control protocol triggered by expiry of the first timer.

18. The apparatus according to claim 17, wherein the first timer is adapted to restart timing operation as triggered by issuance of the retransmission request to delay issuance of a further retransmission request for the missing data unit from the link layer control protocol.

19. The apparatus according to claim 13, wherein the data reordering unit and the data reassembling data unit are adapted execute data reordering and data reassembly in consideration of successfully received data units upon termination of the retransmission process.

20. The apparatus according to claim 19, comprising a receiver window adaptation unit adapted to advance a lower edge of a receiver window upon termination of the retransmission process without receipt of the missing data unit.

21. The apparatus according to claim 19, wherein the missing data completion unit is adapted to send an acknowledgement status report with respect to the missing data unit to a transmitter of the missing data unit upon termination of the retransmission process without receipt of the missing data unit.

22. The apparatus according to claim 13, comprising a first timer setting unit adapted to set the first timer to delay issuance of a retransmission request according to a maximum number of allowed retransmissions for the medium access control protocol.

23. The apparatus according to claim 13, comprising a second timer setting unit of setting the expiry of the second timer upon issuance of the retransmission request for the missing data unit from the link layer control protocol according to at least one service requirement of at least one application using services provided by the link layer control protocol.

* * * * *

UNITED STATES PATENT AND TRADEMARK OFFICE
CERTIFICATE OF CORRECTION

PATENT NO. : 8,254,392 B2
APPLICATION NO. : 12/516711
DATED : August 28, 2012
INVENTOR(S) : Meyer et al.

It is certified that error appears in the above-identified patent and that said Letters Patent is hereby corrected as shown below:

In Fig. 11, Sheet 8 of 9, for Tag "44", in Line 1, delete "Timer U..." and insert -- Timer Unit --, therefor.

In Column 1, Line 49, delete "were" and insert -- where --, therefor.

In Column 5, Line 33, delete "DRAWING" and insert -- DRAWINGS --, therefor.

In Column 9, Line 50, delete "my" and insert -- may --, therefor.

In Column 10, Line 5, delete "unit" and insert -- unit 24 --, therefor.

In Column 11, Line 3, delete "544." and insert -- S44. --, therefor.

In Column 11, Line 28, delete "30" and insert -- 44 --, therefor.

In Column 12, Line 50, in Claim 1, delete "comprising:".

In Column 12, Line 58, in Claim 2, delete "characterized in that" and insert -- wherein --, therefor.

In Column 12, Lines 60-61, in Claim 3, delete "characterized in that it comprises a step of" and insert -- further comprising: --, therefor.

In Column 12, Line 63, in Claim 4, delete "comprising a step of" and insert -- further comprising: --, therefor.

In Column 13, Line 1, in Claim 5, delete "comprising a step of" and insert -- further comprising: --, therefor.

Signed and Sealed this
Ninth Day of April, 2013

Teresa Stanek Rea
*Acting Director of the United States Patent and Trademark Office*

CERTIFICATE OF CORRECTION (continued)

U.S. Pat. No. 8,254,392 B2

In Column 13, Line 5, in Claim 6, delete "comprising a step of" and insert -- further comprising: --, therefor.

In Column 13, Line 14, in Claim 8, delete "comprising a step of" and insert -- further comprising: --, therefor.

In Column 13, Line 18, in Claim 9, delete "comprising a step of" and insert -- further comprising: --, therefor.

In Column 13, Line 23, in Claim 10, delete "comprising a step" and insert -- further comprising: --, therefor.

In Column 13, Line 27, in Claim 11, delete "comprising a step of" and insert -- further comprising: --, therefor.

In Column 13, Line 33, in Claim 12, delete "directly loadable" and insert -- stored --, therefor.

In Column 13, Line 46, in Claim 13, delete "and".

In Column 13, Line 50, in Claim 13, delete "comprising".

In Column 14, Line 3, in Claim 13, delete "timer and" and insert -- timer; and --, therefor.

In Column 14, Line 15, in Claim 17, delete "comprising" and insert -- further comprising: --, therefor.

In Column 14, Line 26, in Claim 19, delete "adapted execute" and insert -- adapted to execute --, therefor.

In Column 14, Line 29, in Claim 20, delete "comprising" and insert -- further comprising: --, therefor.

In Column 14, Line 39, in Claim 22, delete "comprising" and insert -- further comprising: --, therefor.

In Column 14, Line 44, in Claim 23, delete "comprising" and insert -- further comprising: --, therefor.

In Column 14, Line 45, in Claim 23, delete "of setting" and insert -- adapted to set --, therefor.